US006483220B1

United States Patent
Johnsen

(10) Patent No.: US 6,483,220 B1
(45) Date of Patent: Nov. 19, 2002

(54) PRECISION-WOUND ROTOR FOR A DYNAMOELECTRIC MACHINE

(75) Inventor: Tyrone A. Johnsen, Rockford, IL (US)

(73) Assignee: Hamilton Sundstrand Corporation, Rockford, IL (US)

( * ) Notice: Subject to any disclaimer, the term of this patent is extended or adjusted under 35 U.S.C. 154(b) by 0 days.

(21) Appl. No.: 08/493,764

(22) Filed: Jun. 22, 1995

(51) Int. Cl.$^7$ .............................. H02K 3/48; H02K 11/00
(52) U.S. Cl. .......................... 310/179; 310/261; 310/71
(58) Field of Search ............................. 242/7.04, 7.13; 310/179, 194, 215, 261

(56) References Cited

U.S. PATENT DOCUMENTS

| 247,632 A | 9/1881 | Glass | |
|---|---|---|---|
| 1,167,722 A | * 1/1916 | Scott | ......................... 242/7.13 |
| 2,819,514 A | 1/1958 | Polard et al. | ............ 29/155.58 |
| 3,943,392 A | * 3/1976 | Keuper et al. | ............... 310/214 |
| 4,583,696 A | 4/1986 | Mosher | ...................... 242/7.03 |
| 4,603,274 A | 7/1986 | Mosher | ...................... 310/270 |
| 5,298,823 A | * 3/1994 | Johnsen | ........................ 310/71 |

* cited by examiner

Primary Examiner—Tran Nguyen
(74) Attorney, Agent, or Firm—Hamilton Sundstrand Corporation

(57) ABSTRACT

The need for specialized tooling which was previously required to accurately place the first layer of turns in a precision winding of a rotor having an even number of layers of turns is eliminated by providing self-fixturing wire-guiding features in corners of slots in the rotor which receive the winding, thereby facilitating the manufacture or repair of precision-wound rotors. In some exemplary embodiments, the self-fixturing wire-guiding features are provided by configuring the corners of the slots to include a chamfer or shoulder. In other exemplary embodiments, a specially shaped slot liner inserted into the slots includes a corner spacer which provides the self-fixturing wire-guiding feature.

1 Claim, 3 Drawing Sheets

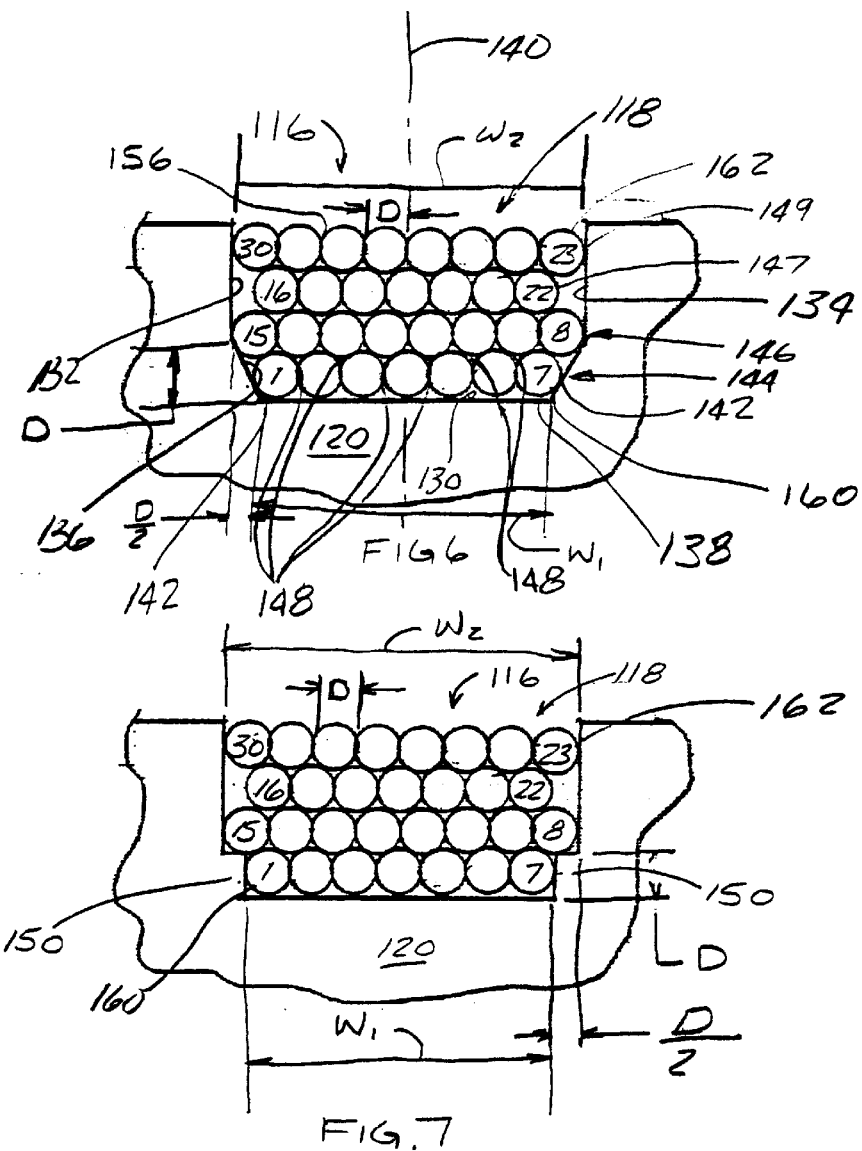
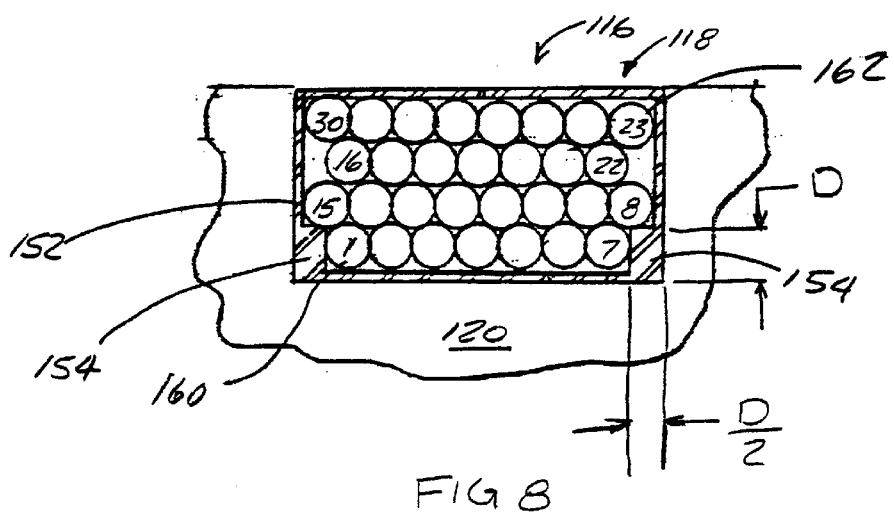

PRECISION-WOUND ROTOR FOR A DYNAMOELECTRIC MACHINE

TECHNICAL FIELD

This invention relates to a precision-wound rotor for a high speed dynamoelectric machine, and more particularly to a structure and a method for facilitating the manufacture of such a rotor.

BACKGROUND

Many dynamoelectric machines, including certain types of electric motors or generators, utilize a rotating member, which is known as a rotor, having a winding formed from layers of turns of wire wound about a rotor core of magnetic material. Rotors which provide superior performance and compact physical size can be produced by precision-winding the turns of wire about the rotor core.

In such precision-wound rotors, as shown in FIG. 1, the turns of wire 1–23 are precisely positioned within generally planar, overlapping layers 144,146,147 of the winding 118 in a side-by-side fashion with each turn in a given layer closely abutting an adjacent turn in that layer. The turns are preferably offset by one-half wire diameter in adjacent layers, so that each turn of wire will rest in a groove 148 formed between adjacent turns of wire in the preceding and any subsequent layers of the winding 118.

The precision-wound winding is generally contained in a slot 116 or channel of the rotor core 102. Ideally, as shown in FIG. 1, the winding 118 is formed in such a manner that the outer turns of wire 1,8,16,23 in the radially innermost and outermost layers 160,162, and the outer turns in alternating intermediate layers, bear simultaneously against a wall 132,134 of the slot 116 and/or one or more adjacent turns of wire in the winding 118, to form a densely packed structure.

In such a densely packed structure, the space occupied by the turns is minimized and remains highly consistent from one rotor to another, thereby allowing such precision-wound rotors to be physically smaller and more tightly toleranced than non-precision-wound rotors. Precision-wound rotors are also inherently more structurally self-supporting due to the interlocking nature of the turns within the slot 116, thereby allowing a precision wound rotor to operate safely at high rotational speed without fear of centrifugal forces causing the turns to shift, in contrast to non-precision-wound rotors in which shifting of the turns is known to occur.

Where cooling fluid is pumped through the winding 118, precision-winding provides superior heat transfer, thereby allowing wire size and/or coolant flow to safely be reduced without fear of the winding overheating. This improved heat transfer results from the turbulent fluid flow which occurs in the small interstices 156 which are formed between adjacent turns of the precision wound rotor. In non-precision-wound rotors, the interstices are larger, thereby causing laminar instead of turbulent fluid flow, which results in lower heat removal capability and the need for larger wire sizes and/or coolant flow rates in order to maintain acceptable temperatures in the winding. Commonly assigned U.S. Pat. Nos. 4,583,696 and 4,603,274 to Mosher are illustrative of precision-wound rotors as described above.

For precision-wound rotors having an odd number of layers of turns, as illustrated in FIG. 1, the tightly wound winding 118 supported by walls 132,134 of the slot 116 as described above, may be readily manufactured with minimal difficulty due to the fact that the first and last layers 160,162 can be configured to extend entirely across the width $W_2$ of the slot 116 in the core 102. However, as illustrated in FIGS. 2 and 3 where the winding 118 includes an even number of layers having each turn nested in a groove 148 formed by turns in an adjacent layer as described above, either the innermost layer 160 or the outermost layer 162 of the turns will not extend entirely across the width $W_2$ of the slot 116, and will thus not be fully supported by the slot walls 132,134.

Stated another way, for the desired nesting of turns to occur in adjacent layers of turns, the turns in one layer of each pair of adjacent layers of the winding 118 must be offset by one-half wire diameter from the turns in the other layer of the pair of layers. For a slot 116 having parallel walls 132,134, this means that if one member of the pair of layers has n turns of wire, the adjacent member of the pair of layers must have either n+1 or n−1 turns. Therefore, if the slot 116 has a width $W_2$ equal to (n+1)×(the wire diameter D), either the innermost 160 or outermost 162 layer of the winding 118 will have only n turns, and thus will not extend entirely across the slot 116, or be supported by the walls 132,134.

If the outermost layer 162 has only n turns, additional structure or winding retaining means may be required to preclude shifting of the turns as the result of centrifugal forces acting on the turns incident with rotation of the rotor. It would appear to be preferable, therefore, to have the innermost layer contain only n turns, as depicted in FIG. 3, since an overlying layer of n+1 turns, which extends entirely across the slot 116 will trap the innermost layer against the bottom surface 130 of the slot, thereby precluding movement. However, with the innermost layer 160 having only n turns, and not extending entirely across the slot width, some means of fixturing the innermost layer during fabrication of the winding must be provided to ensure that the subsequent layers having n+1 turns will fit properly within the slot width and simultaneously nest within the grooves between adjacent turns in the innermost layer of turns. Such fixturing increases the difficulty and cost of manufacturing the precision-wound rotor. The inconvenience and cost of providing such fixturing becomes even more acute with respect to repair or re-manufacturing of a damaged rotor in need of having the winding 118 replaced. Repair or re-manufacturing operations are often preferably carried out at repair centers or depots remote from the facility in which the rotor was originally manufactured. If special fixturing is required for precision winding, duplicate sets of such fixturing will need to be maintained at every remote repair or re-manufacturing facility. In many instances, the cost of maintaining and utilizing such duplicate fixturing at the remote sites will be so prohibitively high that damaged rotors will have to be shipped back to the initial manufacturing facility for repair, or worse yet, simply discarded and replaced with a new rotor, thus greatly increasing the cost of ownership of the dynamoelectric machine.

Accordingly, it is an object of my invention to provide a precision-wound rotor having an even number of layers of turns which is self-fixturing, and may thus be more readily manufactured at low cost without specialized fixturing or tooling. It is also an object of my invention to provide such a rotor in a form which may be readily repaired by re-winding the rotor at a remote repair facility or depot, without the use of specialized fixturing.

SUMMARY

My invention accomplishes these objects in a precision-wound rotor through inclusion of a self-fixturing wire-guiding feature, such as a shoulder or a chamfer, in the corners of slots in the rotor core which contain the precision-wound winding.

Specifically, the precision-wound rotor of my invention includes a magnetic core having a slot therein for receipt of a winding having a first layer of n turns of wire and a second layer of n+1 turns of wire. The slot includes a generally planar bottom surface thereof, and sidewalls intersecting with the bottom surface to form corners of the slot. The sidewalls are disposed equidistant from a slot centerline bisecting and extending perpendicularly outward from the bottom surface of the slot. A self-fixturing wire-guiding feature is provided for centering a first and a second layer of the winding about the slot centerline within the slot in such a manner that when the first layer is formed by winding the turns of the first layer in a side-by-side fashion across the bottom surface of the slot, with each of the turns tightly abutting a radially outer surface of an adjacent turn in the first layer, each pair of adjacent turns in the first layer defines a groove extending parallel to the turns of wire for receipt therein of a turn of wire in the second layer of turns.

According to one aspect of my invention, the wire from which the turns of the winding are formed has a diameter D, and the self-fixturing wire-guiding feature includes a spacer at each corner of the slot having a width substantially equal to about one-half of the wire diameter D extending along the bottom surface of the slot, and a height extending along the sidewall of the slot substantially equal to about the wire diameter D.

According to another aspect of my invention, the wire used to form the turns of the winding has a diameter substantially equal to about D and the sidewalls are configured to define a width W. of the bottom surface of the slot which is substantially equal to about the number of turns n times the wire diameter D, and a second width $W_2$ of the slot substantially equal to about (n+1) times D beginning at a distance substantially equal to about D along the sidewall from the corner of the slot.

In some embodiments of my invention, the self-fixturing wire-guiding feature of my invention is provided by configuring the corners of the slot itself to include a chamfer or a shoulder as defined above. In other embodiments of my invention, the self-fixturing wire-guiding feature is provided by a specially shaped slot liner which is inserted into the slot prior to precision winding of the turns therein.

The self-fixturing wire-guiding features of my invention, thus eliminate the need for special fixturing during either the initial manufacture or subsequent repair and rewinding of a precision-wound rotor. As a result, the cost of initially acquiring, and the long term cost associated with ownership of a dynamoelectric machine having a precision-wound rotor according to my invention are substantially reduced. Other objects, aspects, and advantages of my invention will become readily apparent upon consideration of the following drawings and detailed descriptions of preferred embodiments.

BRIEF DESCRIPTION OF THE DRAWINGS

For all drawing figures included herewith, including those labeled as prior art, like reference numerals have been used to indicate similar elements or features in the interest of clarity of explanation.

DESCRIPTION OF THE INVENTION

Figure 1:
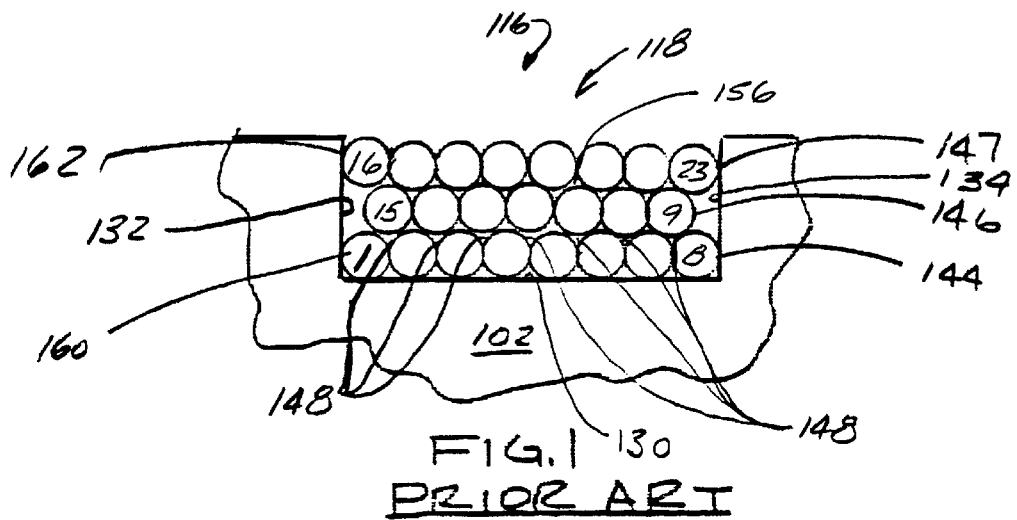
FIGS. 1–3 are schematic cross-sectional representations of layers of turns of wire in a winding of prior precision-wound rotors which illustrate the problems solved by my invention.
Figure 2:
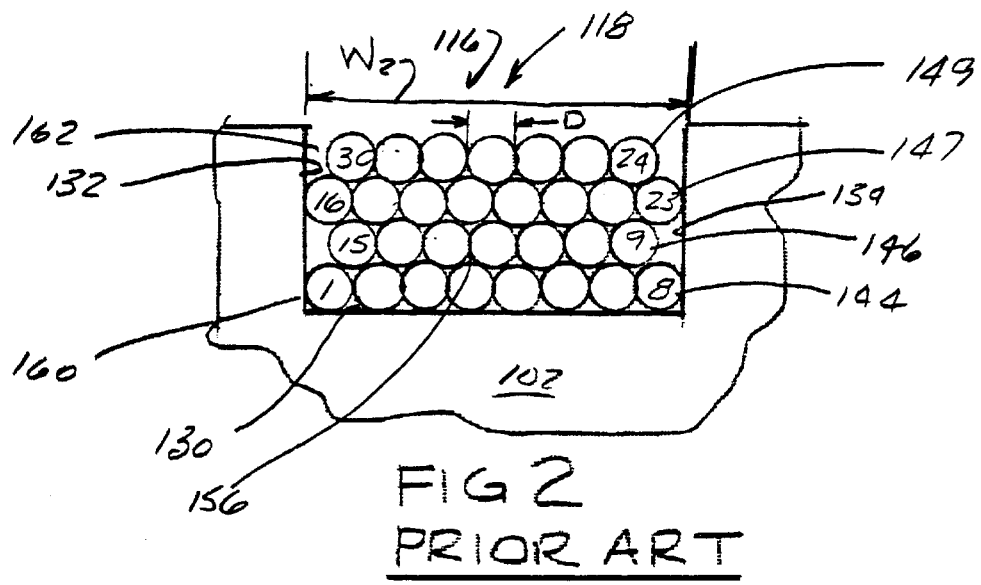
Figure 3:
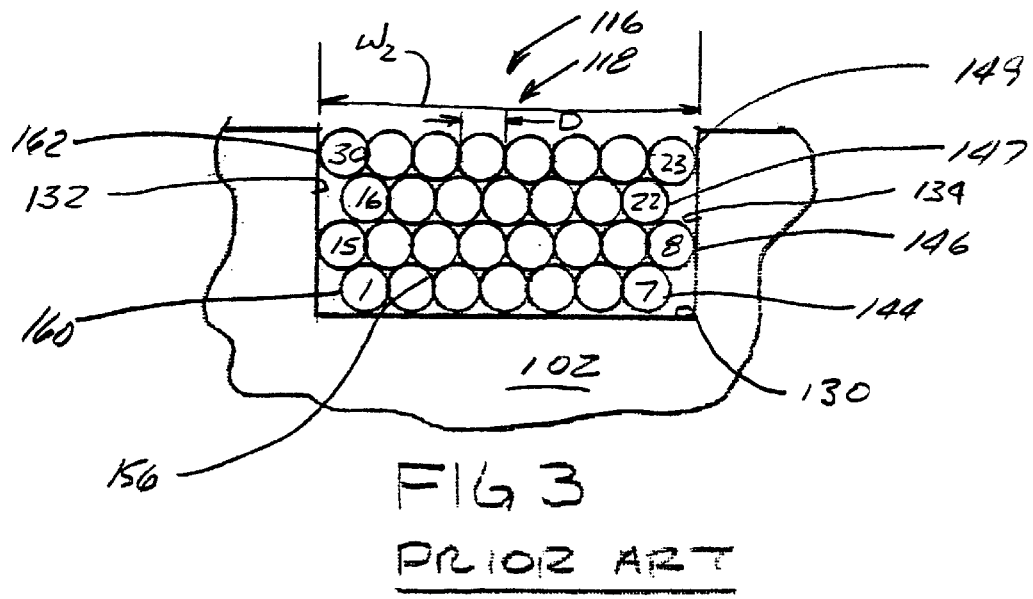
Figure 4:
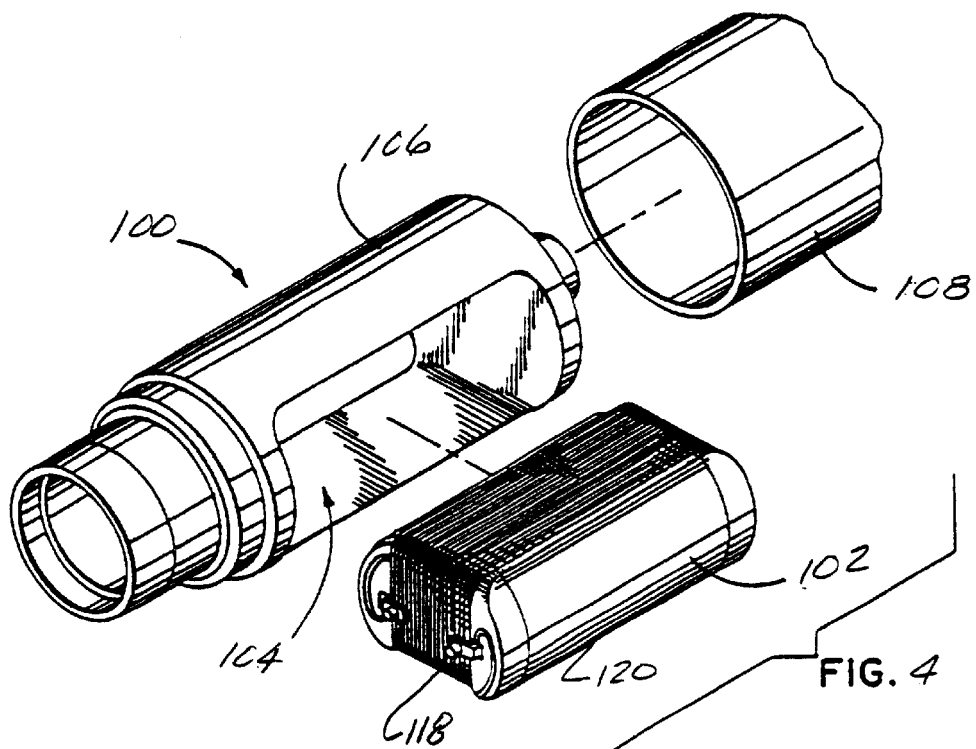
FIG. 4 is an exploded isometric view of a precision-wound rotor according to my invention.

FIG. 4 depicts an exploded three-dimensional view of a precision-wound rotor 100, according to my invention, for a dynamoelectric machine. The rotor 100 includes a precision wound core assembly 102 which is inserted into an elongated slot 104 in a shaft 106 of the rotor 100. The core assembly 102 is secured within the shaft 106 by a cylindrical sleeve or can 108 which is installed over the shaft 106 and core assembly 102 with an interference fit, by a process such as shrink fitting, thereby completing fabrication of the precision-wound rotor 100.

Figure 5:
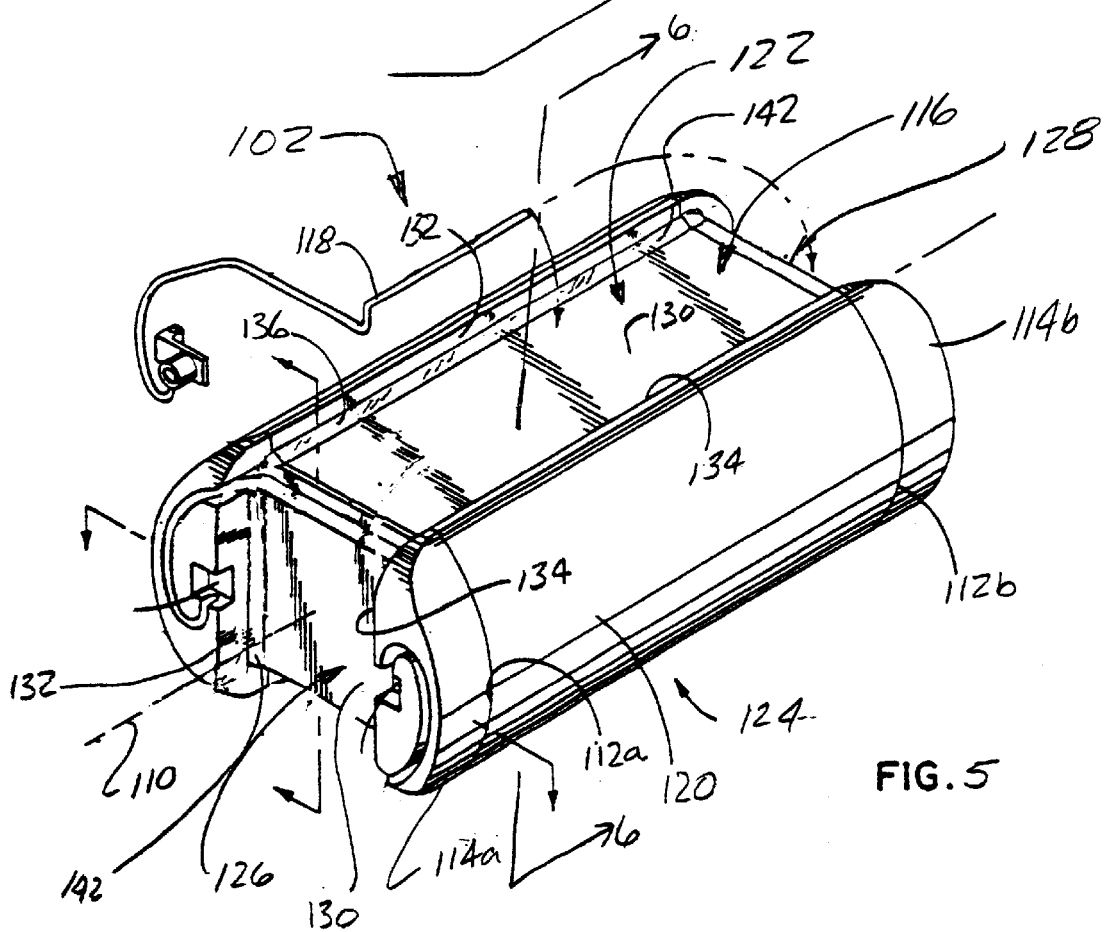
FIG. 5 is an isometric illustration of a precision wound core assembly of the rotor of FIG. 4, FIGS. 6–8 are schematic cross-sectional representations taken along line 6—6 of FIG. 5, illustrating three alternate embodiments of self-fixturing wire-guiding features provided by my invention to facilitate fabrication of the precision winding.

As shown in FIG. 5, the precision wound core assembly 102 has a longitudinal axis 110 and axially spaced core ends 112a, 112b. Each of the axially spaced core ends 112a, 112b is fitted respectively with a winding end support 114a, 114b of an electrically insulative material. The core assembly 102 includes a slot or channel 116 extending in a generally longitudinal direction completely around the core assembly 102, for receipt therein of a winding 118. Specifically, the core assembly 102 includes a central generally cylindrical shaped magnetic core 120 of typical laminated construction which defines two oppositely opening and longitudinally oriented portions 122,124 of the slot 116, thereby resulting in the magnetic core 102 having a generally H-shaped cross section. Each of the winding end supports 114a, 114b respectively defines a transverse portion 126,128 of the slot 116 which extend across each winding support 114a, 114b in alignment with the longitudinally oriented portions 122,124 of the slot 116 to jointly define the entire slot or channel 116 for receipt therein of the winding 118.

As shown in FIG. 6, the winding 118 includes a plurality of turns of wire having a diameter D wound in a generally longitudinal direction about the core 102, to form a first layer 144 having n turns of wire and a second layer 146 having n+1 turns of wire. Specifically, for the exemplary embodiment depicted in FIG. 6, the first layer includes turns 1 through 7, such that n equals 7, and the second layer includes turns 8 through 15, such that (n+1) equals 8.

As shown in FIGS. 5 and 6, the slot 116 includes a generally planar bottom surface 130 thereof and first and second sidewalls 132,134 intersecting with the bottom surface 130 to respectively form corners 136,138 of the slot 116. The sidewalls 132,134 are disposed equidistant from a slot centerline 140 which bisects and extends perpendicularly outward from the bottom surface 130. The corners 136,138 of the slot 116 are configured with a chamfer 142 which provides a self-fixturing wire-guiding means for centering the first and second layers 144,146 of the winding 118 about the slot centerline 140, such that when the first layer 144 is formed by winding turns 1–7 of the first layer 144 in a side by side fashion across the bottom surface 130 of the slot 116, with each of the turns 1–7 tightly abutting a radially outer surface of an adjacent turn of the first layer 144, each pair of adjacent turns in the first layer 144 defines a groove 148 extending parallel to the turns of wire 1–7 in the first layer 144 for receipt therein of a turn of wire 8–15 in the second layer 146 of turns. As shown in FIGS. 7 and 8, the self-fixturing wire-guiding means for centering the first and second layers 144,146 of the winding about the slot centerline 140 may alternatively be provided by either configuring the corners 136,138 of the walls 132,136 of the slot 116 to form a shoulder 150, rather than the chamfer 142, or a slot liner 152 of electrically insulating material having integrally formed corner spacers 154 may be inserted into the slot 116.

Regardless of the particular corner treatment selected, the chamfer 142, the shoulder 150, or the spacer 154, should preferably have a width substantially equal to about ½ of the wire diameter D extending along the bottom surface 130 and a height extending along the sidewalls 132,134 of the slot 116 which is substantially equal to about the wire diameter D. Stated another way, where the wire used to fabricate the winding has a diameter of D and the numeral n refers to the number of turns in the first layer 144 of the winding 118. The sidewalls 132,134 are preferably configured to define a width $W_1$ at the bottom surface 130 of substantially about n times D, and a width $W_2$ of the slot 116 substantially equal to about (n+1) times D beginning at a distance substantially equal to about D from the corners 136,138 formed by the intersection of the sidewalls 132,134 and the bottom surface 130.

From the foregoing description, those skilled in the art will readily recognize that the self-fixturing wire-guiding features of my invention provide the means for fabricating a precision-wound rotor in a straight-forward, low cost manner, without the need for special fixturing. Specifically, my invention allows a precision wound electrical winding to be installed in a rotor by a two step process. In the first step, the first layer 144 of turns is wound across the bottom surface 130, starting with a first turn 1 disposed in simultaneous contact with one of the chamfers 142, shoulders 150, or spacers 154, etc., at the intersection of a first sidewall 132 and the bottom surface 130, and continuing with subsequent turns 2–7 each wound in a manner to tightly abut the previous turn across the bottom surface until the 7th turn is wound adjacent the second sidewall 134. The second layer 146 is then wound back across the first layer 144 starting with a first turn 8 of the second layer 146 adjacent the sidewall 134, and winding each subsequent turn 9–15 of the second layer in such a manner that each turn closely abuts a radially outer surface of the previous turn in the second layer 146 and simultaneously resides in a groove 148 formed between adjacent turns of the first layer 144, until turn 15 of the second layer is wound adjacent to the first sidewall 132. Subsequent layers of turns 147,149 are wound in the same fashion as the second layer 146 of turns, with each turn in each subsequent layer of turns closely abutting a radially outer surface of the previous turn in that layer and simultaneously residing in a groove 148 formed between adjacent turns of wire in the preceding layer.

For windings having an even number of layers of turns, my invention thus results in both the innermost 160 and outermost layers 162 of turns being fully supported by the sidewalls 132,134 of the slot 116 as illustrated by turns 1, 7, 23, and 30 in FIGS. 6–8. Intermediate layers are either tightly contained within the sidewalls 132,134 of the slot 116, as illustrated by turns 8 and 15 in FIGS. 6–8, or are tightly nested and contained within grooves formed by layers of turns extending entirely across the slot as illustrated by the layer of turns 16–22 in FIGS. 6–8. Because the turns are so tightly nested, interstices 156 formed between the individual turns are of minimal cross-section and therefore promote maximum fluid velocities of coolant flowing through the interstices leading to turbulent flow conditions and optimum heat transfer from the winding to the cooling fluids.

Those skilled in the art will further recognize that the procedure for fabricating the winding 118 described above, and the advantages gained through the practice of my invention, are the same for a rotor which is being repaired as for a new rotor completing initial manufacture. No additional tooling is required to rewind the rotor, and the self-fixturing wire-guiding means of my invention ensure that the precision winding of a rotor which has been repaired will be essentially identical in all respects with a newly manufactured rotor. The only additional steps required to repair or rewind a rotor are removal of the sleeve 105 and the core assembly 102 from the rotor 100, and stripping off the old winding 118 prior to installing a new winding. Once the core assembly 102 has been rewound, it may be reinstalled in the shaft 106 and the sleeve 105 replaced to complete assembly of the precision-wound rotor 100 in the same manner as during original manufacture.

From the foregoing description, those skilled in the art will readily recognize that the self-fixturing wire-guiding features of my invention thus overcome problems encountered in prior precision-wound rotors which required specialized fixturing for their manufacture, or additional structural support for the winding, and in particular for precision-wound rotors having an even number of layers of turns. Those skilled in the art will further recognize that although I have described my invention herein with respect to certain specific embodiments and applications thereof, many other embodiments and applications of my invention are possible within the scope of my invention as described in the appended claims. For instance, although I have made numerous references herein to applications of my invention in a rotor of a dynamoelectric machine, my invention is by no means limited to use only in the rotor of such machines. My invention may be used with equal efficacy in stationary portions of dynamoelectric machines such as in stator windings of such machines. Furthermore, I wish to specifically point out that certain commonly used elements and features of dynamoelectric machine rotor manufacture have been purposely omitted from the illustrations of the exemplary embodiments described herein for purposes of clarity in describing the invention. For example, a slot liner of non-electrically conductive material would typically be included between the winding 118 and slot 116 in an actual rotor construction. It is contemplated that such additional structures or features would be included in a rotor built according to my invention.

It is understood, therefore, that the spirit and scope of the appended claims should not be limited to the specific embodiments described and depicted herein.

I claim:
1. A rotor comprising:
   a winding having a first layer of n turns of wire and a second layer of n+1 turns of wire, wherein said wire has a diameter D;
   a magnetic core having a slot therein for receipt of said winding, said slot respectively intersecting with said bottom surface to form first and second corners of said slot, said slot having a generally planar bottom surface thereof and first and second sidewalls of said slot, said sidewalls being disposed equidistant from a slot centerline bisecting and extending perpendicularly outward from said bottom surface;
   wire guiding means disposed within said corners of said slot for centering said first and second layers of said winding about said slot centerline within said slot such that when said first layer is formed by winding said turns of said first layer in a side by side fashion across said bottom of said slot, with each of said turns tightly abutting a radially outer surface of an adjacent turn of said first layer, each pair of adjacent turns in said first layer defines a groove extending parallel to said turns of wire for receipt therein of a turn of wire in said second layer of turns, wherein said wire guide means are provided by a slot liner within said slot;

said slot liner being configured to define a first width of said liner adjacent said bottom surface of substantially about n times D, and a second width of said liner substantially equal to about (n+1) times D beginning at a distance substantially equal to about D along said sidewalls from said corners;

whereby said wire guiding means are formed integrally with and provided by said liner, thereby making said rotor self-fixturing and substantially eliminating the need for separate wire guiding tooling, other than said liner, during both initial manufacture and subsequent re-winding or other repair of said rotor; and wherein said winding is formed by the steps of:

a) winding said first layer of n turns across said bottom surface, starting with a first turn disposed in contact with said wire guiding means in said first corner of said slot and continuing with subsequent turns wound tightly abutting the previous turn across the bottom surface until and nth turn of said first layer is wound adjacent said second wire guiding means in said second corner of said slot; and b) then winding said second layer back across said first layer, starting with a first turn of said second layer adjacent said second sidewall and winding each subsequent turn of said second layer to simultaneously closely abut a radially outer surface of the previous turn of said second layer and to reside in a groove formed between adjacent turns of the turns of the first layer, until a final turn of the second layer is wound adjacent to said first sidewall.

* * * * *